Patented Dec. 9, 1947

2,432,403

UNITED STATES PATENT OFFICE 2,432,403

MONOAZO DYES

Friedrich Felix and Henri Riat, Basel, Switzerland, assignors to Society of Chemical Industry in Basle, Basel, Switzerland, a Swiss firm No Drawing. Application January 23, 1945, Serial No. 574,209. In Switzerland February 2, 1944

4 Claims. (Cl. 260—206)

It is known that valuable mordant dyestuffs are obtained by coupling 2:4-diaminobenzene-1-sulfonic acid with unsulfonated diazo compounds, such as e. g. those derived from 1-hydroxy-2-amino-4:6-dinitrobenzene or from 1-hydroxy-2-amino-5-nitrobenzene. Such dyestuffs produce dyeings on the animal fiber which are changed by after-chroming into deep brown and then possess excellent wet fastness properties besides good fastness to light.

According to this invention there are obtained dyestuffs which are distinguished from these known products by essentially improved tinctorial properties when using as coupling components, instead of the 2:4-diaminobenzene - 1 - sulfonic acid, compounds of the general formula

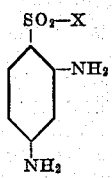

wherein X stands for an alkyl, aralkyl or aryl group or for an amino group which may contain substituents.

These coupling components which constitute new compounds are obtained for example by subjecting the 2:4-dinitrobenzene-1-sulfochloride first of all to suitable reactions, such as for example either reduction of the sulfochloride group to a sulfonic acid group and subsequent alkylation or aralkylation, or reaction according to Friedel-crafts with aromatic hydrocarbons, or to a reaction with suitable amino compounds, such as e. g. ammonia or diethylamine, and then effecting the reduction of the two nitro groups to amino groups. Products corresponding to the above explained general formula

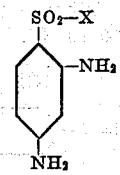

are, for example, 2:4-diaminobenzene-1-methylsulfone, 2:4 - diamino - benzene - 1 - ethylsulfone, 2:4 - diaminobenzene - 1 - benzylsulfone, 2:4 - diaminobenzene - 1 - phenylsulfone, 2:4-diaminobenzene - 1 - sulfamide, 2:4 - diaminobenzene - 1 - diethylsulfamide, 2:4-diaminobenzene-1-phenylsulfamide and the like. If the new compounds contain a further aryl nucleus besides the aromatic radical containing the two amino groups standing in meta-position to each other, this may carry a group imparting solubility in water, such as for example a sulfonic acid group.

With regard to the diazotizing components, these may contain either sulfonic acid groups or be unsulfonated. The invention is not limited to the use of diazo compounds which are derived from ortho-amino-phenol or orthoamino-naphthalene. Quite generally there can be used such diazotizing components which contain an atom grouping in ortho-position to the diazotizable amino group which is capable of taking part in the formation of metal complexes in the resulting azo-dyestuff. Examples of such diazotizing components are:—1-hydroxy-2 - aminobenzene, 1 - hydroxy-2-amino-4-chlorobenzene, 1 - hydroxy - 2 - amino - 4 - nitrobenzene, 1 - hydroxy - 2 - amino - 4:6 -dinitrobenzene, 1 - hydroxy - 2 - amino - 4:6 - dichlorobenzene, 1 - hydroxy - 2 - amino - 3:4:5:6 - tetrachlorobenzene, 1 - hydroxy-2-aminobenzene-4-sulfonic acid, 1-hydroxy-2-amino-6-chlorobenzene - 4 - sulfonic acid, 1 - hydroxy - 2 - amino-4-chlorobenzene - 6 - sulfonic acid, 1 - hydroxy - 2-amino - 4 - nitrobenzene - 6 - sulfonic acid, 1-hydroxy-2-amino-6-nitrobenzene-4-sulfonic acid, 1 -hydroxy- 2 -amino- 4 -methyl-benzene, 1 - hydroxy - 2 - amino- 4 -methyl-benzene- 6 -sulfonic acid, 1 -hydroxy- 2 -amino- 4 -chloro-6-nitrobenzene, 1 - hydroxy- 2 -amino-4-nitro-6-chlorobenzene and the like. Further in the napthalene series the diazo compound of 1-amino-2-hydroxy-naphthalene-4-sulfonic acid and their nitrated and halogenated derivatives, and the 2-amino-1-hydroxynaphthalene-4:8-disulfonic acid.

Among ortho-aminocarboxylic acids are included:— 1 - aminobenzene - 2 - carboxylic acid, 2-aminonaphthalene-3-carboxylic acid, 1-amino-4-chlorobenzene-2-carboxylic acid, 1-amino-4-nitrobenzene - 2 - carboxylic acid, 1 - amino - 4 - acetylaminobenzene-2-carboxylic acid, 1-amino-4:6-dibromobenzene-2-carboxylic acid, and the like.

As mentioned above, the new dyestuffs are mordant dyes which dye the animal fibers yellow to red and brown shades which are changed by afterchroming into generally brown or deeper shades which are characterized by excellent properties. Many of the new dyestuffs possess the valuable and remarkable properties that they can be used in the one bath process with addition of chrome mordants.

The new dyestuffs correspond therefore to the general formula

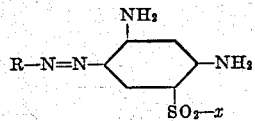

wherein R stands for an aromatic nucleus of the benzene or naphthalene series containing in ortho-position to the —N=N— group a carboxyl group or a hydroxyl group and $x$ has the already indicated signification. Particularly valuable are those dyestuffs in which R stands for a benzene nucleus which contains a hydroxyl group in ortho-position to the —N=N— group and besides at least one nitro group, and $x$ stands for a group selected from the group consisting of alkyl radicals having at the most two carbon atoms,

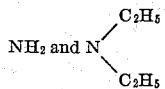

the preferred ones among these being the dyestuffs wherein $x$ stands for an alkyl radical containing at the most two carbon atoms.

The new dyestuffs can be converted into complex metal compounds, for example, complex chromium compounds, not only on the fiber, but also in substance. Dyestuffs are then obtained which can be used as acid dyestuffs provided that they contain the groups imparting solubility.

The following examples illustrate the invention but are not to be regarded as limiting it in any way, the parts being by weight.

*Example 1*

199 parts of 1-hydroxy-2-amino-4:6-dinitrobenzene are diazotized in the usual manner at 50° C. and to this solution is added a solution prepared from 136 parts of 2:4-diaminobenzene-1-methylsulfone, 100 parts of concentrated hydrochloric acid and 1500 parts of water. A concentrated solution of 550 parts of sodium acetate is then added in order to bind the mineral acid. The mixture is stirred for 24 hours at 30° C. and for 12 hours at 40° C. The dyestuff is precipitated in beautiful crystals. The whole is heated to 70° C., the dyestuff of the formula

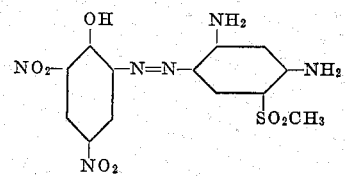

is suction-filtered and washed with warm water until the filtrate is colorless. When dry, the dyestuff is obtained as a dark red powder. It dissolves sparingly in hot water, but very easily in a dilute solution of sodium carbonate to a red brown solution. Wool is dyed from an acid bath red orange tints which change by after-chroming into blackish brown. The same result is also obtained when working according to the one bath process.

*Example 2*

199 parts of 1-hydroxy-2-amino-4:6-dinitrobenzene are diazotized and the suspension of the diazo compound is coupled at 30° C. with a methyl alcohol solution of 200 parts of 2:4-diaminobenzene-1-ethylsulfone. The mineral acid is completely neutralized by a concentrated solution of sodium acetate. Coupling is complete after stirring for 18 hours at 30–40° C. The whole is heated to 70° C., the dyestuff of the formula

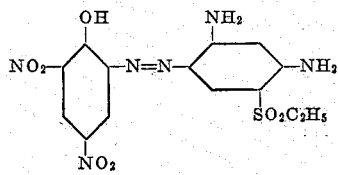

is suction-filtered and thoroughly washed with warm water. When dry, the dyestuff is a dark red brown powder. It is easily dissolved in a dilute solution of sodium carbonate to a red brown solution. The dyestuff dyes wool from an acid bath red orange tints. By after-treating with chromium there is obtained a strong brown.

Instead of 1-hydroxy-2-amino-4:6-dinitrobenzene there can also be used in the foregoing examples as diazotizing component 1-hydroxy-5-nitro-2-aminobenzene, 1-hydroxy-4-chloro-5-nitro-2-aminobenzene, 1-hydroxy-4-nitro-2-aminobenzene, 1-hydroxy-4-chloro-2-aminobenzene, further 1-hydroxy-2-aminobenzene-4-sulfonic acid, 1-hydroxy-2-aminobenzene-4-sulfamide, 1-hydroxy-2-amino-4-chlorobenzene-6-sulfonic acid, 1-hydroxy-2-amino-4-nitrobenzene-6-sulfonic acid, 1-hydroxy-2-amino-6-nitrobenzene-4-sulfonic acid, 1-aminobenzene-2-carboxylic acid, 1-aminobenzene-2-carboxylic acid-4- or -5-sulfonic acid, chlorinated or brominated anthranilic acids and the like.

The 2:4-diaminobenzene-1-alkylsulfones used as coupling components have been prepared in the following manner: 2:4:2':4'-tetranitro-diphenyl-disulfide produced from 2:4-dinitrochlorobenzene and sodium disulfide is reduced in an alcohol solution with sodium sulfide and converted into the thioether with an alkylating agent, such as for example dimethylsulfate or diethylsulfate. This is oxidized in a solution of glacial acetic acid with hydrogen peroxide and the resulting sulfone is reduced with iron in usual manner.

The following process can also be adopted: 2:4:2':4'-tetranitro-diphenyl disulfide is reduced with sodium sulfide and the resulting 2:4-dinitrothiophenol is reacted with choroacetic acid to form 2:4-dinitro-thioglycolic acid. This is oxidized with hydrogen peroxide to the corresponding sulfone, the carboxyl group is split off in known manner and the nitro groups are reduced to amino groups in known manner.

The 2:4-diaminobenzene-1-methylsulfone crystallizes from hot water in white laminae melting at 105° C. The 2:4-diaminobenzene-1-ethylsulfone is recrystallized from dilute alcohol; it melts at 71° C.

*Example 3*

187 parts of 2:4-diaminobenzene-sulfamide are dissolved in 1500 parts of aqueous methyl alcohol of 50 per cent. strength and coupled at 30–40° C. with the diazonium salt from 199 parts of 1-hydroxy-2-amino-4:6-dinitrobenzene. The solution is made neutral to congo by addition of solid sodium acetate. When coupling is complete, the whole is heated to 70° C., the dyestuff of the formula

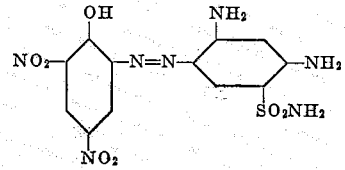

is suction-filtered and washed with warm water. When dry, it is a brown powder which dissolved in a dilute solution of sodium carbonate to a red brown solution. It dyes wool from an acid bath red brown tints. When after-treated with chromium there is obtained a strong brown tint.

*Example 4*

The diazonium salt from 199 parts of 1-hydroxy-2-amino-4:6-dinitrobenzene is added at 30° C. to a warm methyl alcohol solution of 243 parts of 2:4-diaminobenzene-diethylsulfamide. After neutralizing with mineral acid, the solution is stirred with sodium acetate until the diazonium salt has disappeared. It is then heated to 70° C. and the dyestuff of the formula

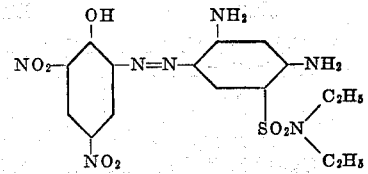

is suction-filtered and washed with warm water. The dry dyestuff forms a brown powder. It dissolves readily in a dilute solution of sodium carbonate. Wool is dyed from an acid bath red-orange tints which change by after-chroming into a yellowish brown.

Instead of 1-hydroxy-2-amino-4:6-dinitrobenzene there can be used in Examples 3 and 4 the diazotizing components named in the introduction or at the end of Example 2.

The sulfamides which have been used were prepared as follows:

2:4:2′:4′ - tetranitro - diphenyl - disulfide obtained from 2:4-dinitrochlorobenzene and sodium disulfide is converted into 2:4-dinitrobenzene sulfochloride—by chlorination in an acetic acid suspension. The chloride is reacted with ammonia or an alkylamine, such as diethylamine, and the resulting dinitrosulfamides are reduced with iron in known manner.

The 2:4-diaminobenzenesulfamide crystallizes from water and has a melting point of 155° C.

The 2:4-diaminobenzenediethylsulfamide crystallizes from dilute alcohol and melts at 80° C.

The following table indicates the shades of dyeings obtained with a further number of azo-dyestuffs produced according to the present invention:

The dyestuff (15) of the above table in free form has the formula

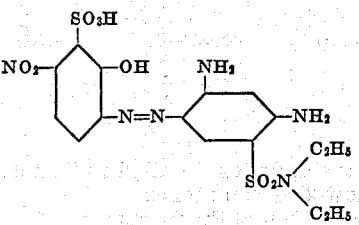

Example 5

100 parts of thoroughly wetted wool are introduced at 60° C. into a dye-bath containing per 4000 parts of water, 2 parts of the dyestuff obtained according to Example 3, 2.5 parts of ammonium sulfate, 2.5 parts of sodium chromate and 10 parts of Glauber's salt, the temperature is raised to the boil within 30 minutes and dyeing is continued for ¾ hour at the boil. 0.5 to 1 per cent. of acetic acid of 40 per cent. strength is added and dyeing continued for a further hour. The wool is then rinsed and dried. It is dyed fast brown shades.

Example 6

100 parts of thoroughly wetted wool are introduced at 60° C. into a dye-bath containing per 4000 parts of water, 2 parts of the dyestuff obtained according to Example 1, first paragraph, 4 parts of acetic acid of 40 per cent. strength and 10 parts of Glauber's salt, the temperature is raised to the boil within 30 minutes and dyeing is continued for 45 minutes at the boil. 1 part of sulfuric acid of 66° Bé. is added and the material is further dyed for 15 minutes at the boil. The dye-bath is cooled to about 70° C., 1 part of potassium bichromate is added, the bath is again heated to boiling and chroming is effected for about 40 minutes at the boil. The wool is dyed fast brown shades.

| Diazotizing Component | Coupling Component | Shades | |
|---|---|---|---|
| | | from an acid bath | after-chromed |
| (1) 1-hydroxy-5-nitro-2-aminobenzene | 2:4-diaminobenzene-1-methylsulfone | yellow orange | strong violet brown. |
| (2) 1-hydroxy-4-nitro-2-aminobenzene | ......do...... | yellow | yellow brown. |
| (3) 1-hydroxy-4-chloro-2-aminobenzene | ......do...... | olive yellow | reddish violet. |
| (4) 1-hydroxy-4-nitro-2-aminobenzene-6-sulfonic acid | ......do...... | orange | yellow brown. |
| (5) 1-hydroxy-5-nitro-2-aminobenzene | 2:4-diaminobenzene-1-ethylsulfone | red brown | violet brown. |
| (6) 1-hydroxy-4-nitro-2-aminobenzene | ......do...... | dull reddish yellow | yellow brown. |
| (7) 1-hydroxy-4-chloro-2-aminobenzene | ......do...... | green yellow | reddish violet brown. |
| (8) 1-hydroxy-5-nitro-2-aminobenzene | 2:4-diaminobenzenesulfamide | reddish brown | strong violet brown. |
| (9) 1-hydroxy-4-nitro-2-aminobenzene | ......do...... | yellow | brown. |
| (10) 1-hydroxy-4-chloro-2-aminobenzene | ......do...... | green yellow | violet brown. |
| (11) 1-hydroxy-4-nitro-2-aminobenzene-6-sulfonic acid | ......do...... | orange | brown. |
| (12) 1-hydroxy-5-nitro-2-aminobenzene | 2:4-diaminobenzenediethylsulfamide | dirty yellow | violet brown. |
| (13) 1-hydroxy-4-nitro-2-aminobenzene | ......do...... | green olive yellow | yellow brown. |
| (14) 1-hydroxy-4-chloro-2-aminobenzene | ......do...... | green yellow | violet brown. |
| (15) 1-hydroxy-4-nitro-2-aminobenzene-6-sulfonic acid | ......do...... | orange | brown. |

The dyestuff (2) of the above table has the formula

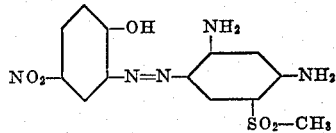

The dyestuff (5) of the above table has the formula

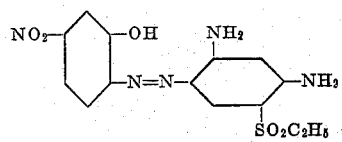

What we claim is:

1. An azo-dyestuff of the formula

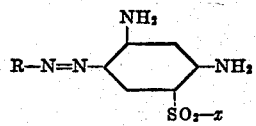

which is free from sulfo groups and wherein R stands for a benzene nucleus which contains an OH— group in ortho-position to the —N=N— group and which is substituted by at least one nitro group, and $x$ stands for an alkyl radical containing at the most 2 carbon atoms.

2. An azo-dyestuff of the formula:

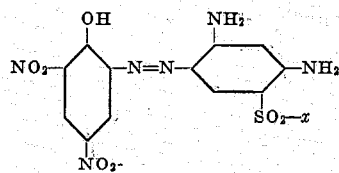

wherein $x$ stands for an alkyl radical containing at the most 2 carbon atoms.

3. The dyestuff of the formula

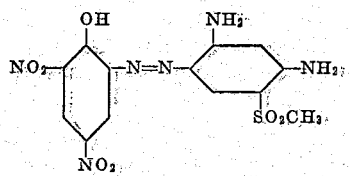

4. The dyestuff of the formula

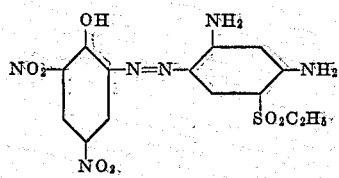

FRIEDRICH FELIX.
HENRI RIAT.

REFERENCES CITED

The following references are of record in the file of this patent:

UNITED STATES PATENTS

| Number | Name | Date |
|---|---|---|
| 2,200,543 | Dickey et al. | May 14, 1940 |
| 1,893,557 | Krzikaller | Jan. 10, 1933 |

FOREIGN PATENTS

| Number | Country | Date |
|---|---|---|
| 262,243 | Great Britain | Dec. 9, 1926 |

OTHER REFERENCES

Soc. pour l'Industrie Chimique, 483,019, page 4, Feb. 27, 1917.